United States Patent [19]

Wisyanski

[11] 4,288,033

[45] Sep. 8, 1981

[54] CONTROL VALVE ASSEMBLY

[75] Inventor: Thomas W. Wisyanski, Terryville, Conn.

[73] Assignee: Century Brass Products, Inc., Waterbury, Conn.

[21] Appl. No.: 138,673

[22] Filed: Apr. 9, 1980

Related U.S. Application Data

[63] Continuation of Ser. No. 925,274, Jul. 17, 1978, abandoned.

[51] Int. Cl.³ .............................................. G05D 23/12
[52] U.S. Cl. .................. 236/93 A; 236/34.5; 236/100; 251/337
[58] Field of Search ................ 236/34, 34.5, 93 A, 236/99 J, 100; 251/337

[56] References Cited

U.S. PATENT DOCUMENTS

| | | | |
|---|---|---|---|
| 2,396,138 | 3/1946 | Vernet | 236/34 X |
| 2,795,381 | 6/1957 | Eskin | 236/93 A |
| 2,830,767 | 4/1958 | Herbenar | 236/34.5 X |
| 2,837,285 | 6/1958 | Urban | 236/34.5 |
| 2,881,616 | 4/1959 | Clifford et al. | 73/363 |
| 2,889,113 | 6/1959 | Kozel et al. | 251/366 X |
| 3,454,220 | 7/1969 | Bentz et al. | 236/34 |

*Primary Examiner*—William E. Topolcai, Jr.
*Attorney, Agent, or Firm*—Hayes & Reinsmith

[57] ABSTRACT

A control valve assembly incorporates direct metal-to-metal engagement between a casing of a temperature-responsive valve actuator and a piston guide to promote ease and accuracy of calibration. In addition, a substantially frictionless override feature is incorporated in the assembly to effect pressure relief and to accommodate thermal excursion of the valve actuator beyond the travel required to effect the desired valve movement.

4 Claims, 3 Drawing Figures

U.S. Patent
Sep. 8, 1981
4,288,033
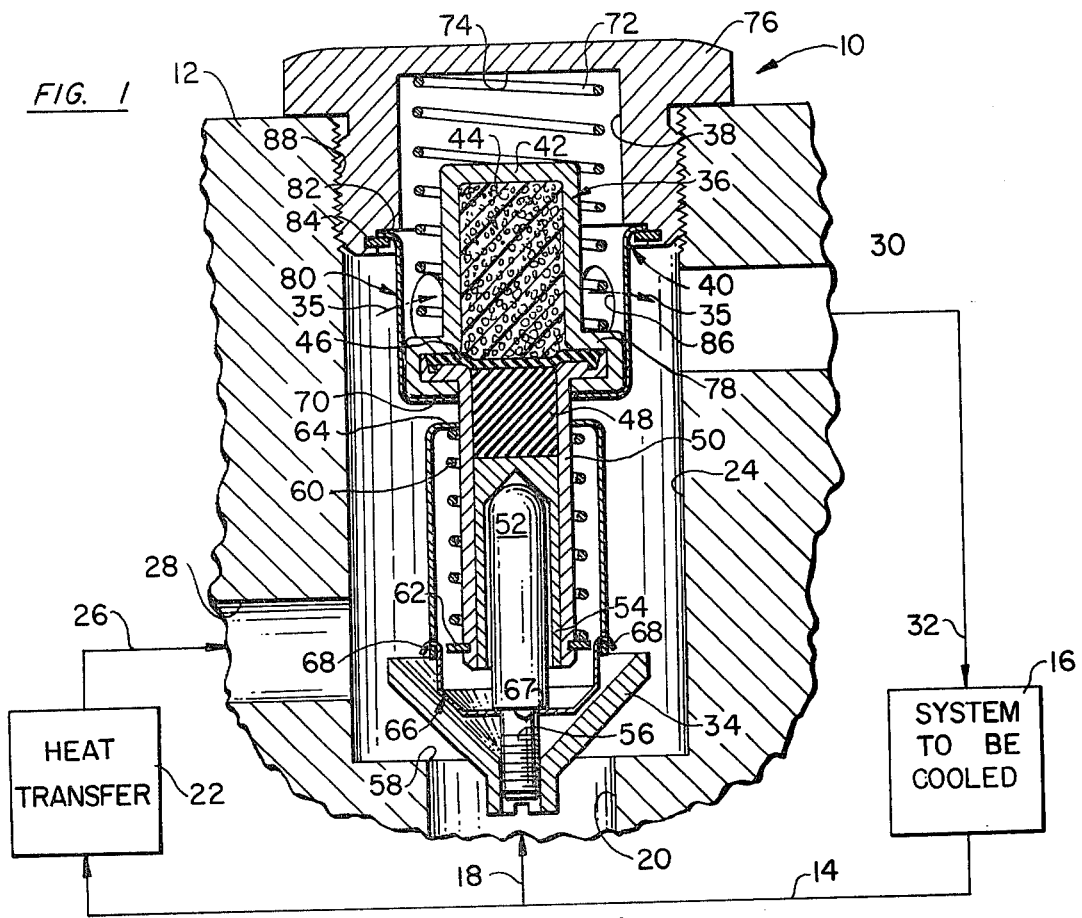
FIG. 1
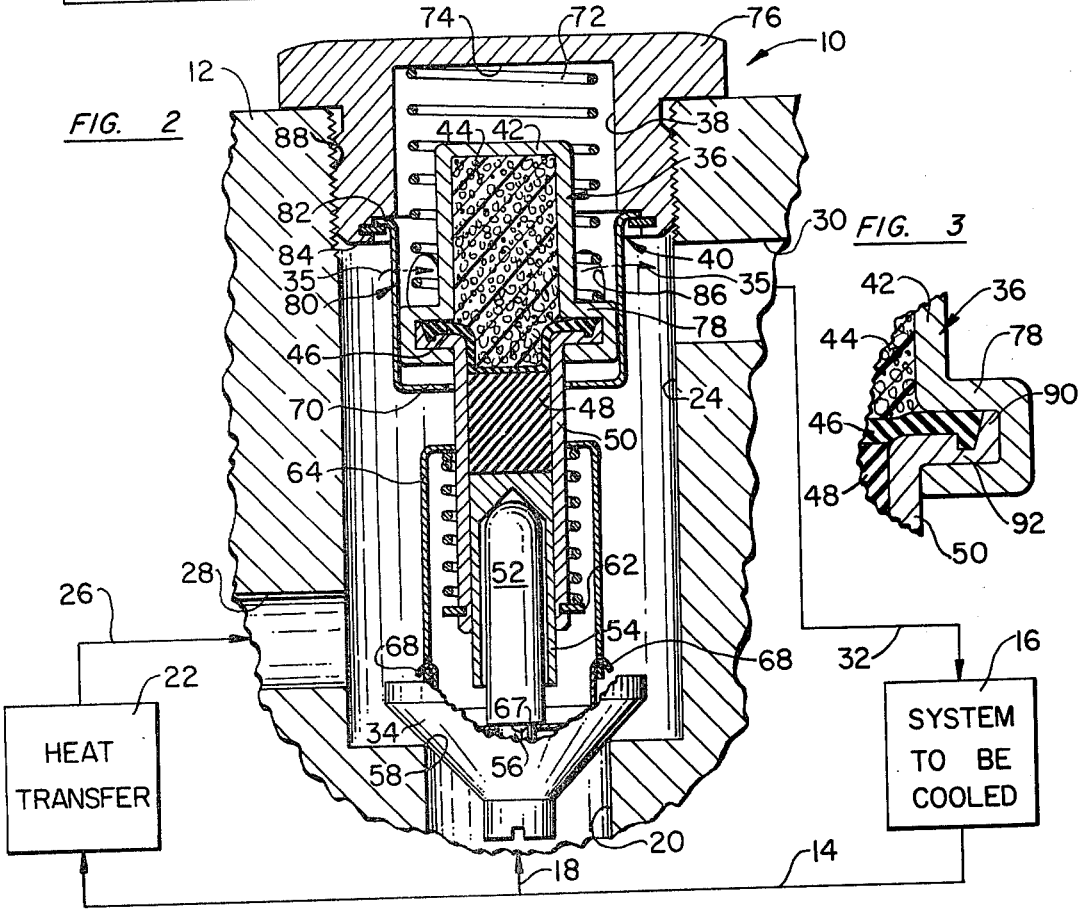
FIG. 2
FIG. 3

CONTROL VALVE ASSEMBLY

This is a continuation of application Ser. No. 925,274, filed July 17, 1978, now abandoned.

This invention generally relates to thermostatic valves and particularly concerns a combination temperature and pressure responsive fluid flow control assembly.

A primary object of this invention is to provide a new and improved temperature and pressure responsive combination fluid flow control assembly particularly designed to minimize costly machining operations of component parts and to provide quick and easy calibration and assembly using a minimized number of different parts.

Another object of this invention is to provide an assembly of the above described type which features a simplified rugged construction to function accurately and reliably under demanding conditions of extreme vibration and widely varying temperature and pressure changes.

Other objects will be in part obvious and in part pointed out in more detail hereinafter.

A better understanding of the objects, advantages, features, properties and relations of this invention will be obtained from the following detailed description and accompanying drawing which sets forth an illustrative embodiment and is indicative of the way in which the principle of this invention is employed.

In the drawing:

FIG. 1 is a side view, partly broken away and partly in section, showing a valve control assembly incorporating this invention shown installed in a system for controlling fluid temperatures and wherein a valve member of the assembly is in an open position;

FIG. 2 is a view similar to FIG. 1 showing the valve member in closed position; and FIG. 3 is an enlarged section view of a portion of the power element.

Referring to the drawing in detail, a combination temperature and pressure responsive fluid flow control assembly is generally denoted by the numeral 10 and is of a type which is temperature actuated and incorporates a pressure relief feature for use in aircraft engine and hydraulic system coolers, air compressor cooling systems and like applications such as engine and transmission oil coolers. The assembly 10 is shown in a typical installation diagramatically illustrated wherein a block 12 has a flow passage 14 connecting a system 16 to be controlled to a passage 18 communicating with an inlet port 20 to chamber 24 within block 12. Passage 14 also connects to a heat exchanger or cooler 22, for example, which communicates with chamber 24, wherein assembly 10 is installed, through a passage 26 and port 28. Outlet port 30 serves to communicate chamber 24 and the system 16 being controlled via passage 32.

Assembly 10 in FIG. 1 is shown in an open or so-called cold position. As the temperature of fluid flowing from the controlled system 16 increases, assembly 10 is actuated to correspondingly drive valve member 34 downwardly to decrease flow through inlet port 20 and increase flow through port 28 exiting from cooler 22. The combined flow of fluid through ports 20 and 28 provide a controlled temperature flow of fluid as indicated by arrows 35 to the system 16 through outlet port 30 of chamber 24. A continual increase in temperature will ultimately close port 20 and force all flow through cooler 22.

For effective fluid temperature control, a fast-acting temperature responsive valve actuator or thermostatic power element 36 is mounted within chamber 38 of housing 40 of assembly 10. Power element 36 includes a casing 42 within which is contained a special pellet mix of a suitable thermally sensitive material that expands as temperature increases. The chemical composition of the thermally expansible material 44 may be varied to create desired operating temperature ranges. Material 44 is sealed off within casing 42 by a molded elastomeric diaphragm 46. Below diaphragm 46 is a piston-like oversize plug 48 of similar material. When the thermally expansible material 44 expands, as a result of temperature increase, plug 48 is forced downwardly into a piston guide 50 which is integrally secured to casing 42 to drive piston 52 downwardly responsive to movement of a surrounding piston sleeve 54 fitted within guide 50. The valve member 34 is carried on an exposed stem 56 of piston 52 and is shown urged toward a valve seat 58 of inlet port 20 against the force of a return spring 60. Return spring 60 is shown having its opposite ends seated on a washer 62, fixed to guide 50, and a bracket 64 mounted for movement axially of piston guide 50 by a retainer 66 secured to piston 52 against a shoulder 67 formed by the reduced diameter stem 56 of piston 52. To minimize labor expense and material, retainer 66 is particularly designed to be formed of stamped metal construction and is shown having reversely extending free ends 68 which will be understood to project through suitable openings in bracket 64.

By such construction, a return force is provided by spring 60 for retracting valve member 34 into open position upon cooling. Valve member 34 moves relative to power element 36 and guide 50 responsive to expansion of return spring 60 forcing bracket 64 upwardly as viewed in the drawing to retract retainer 66 and piston 52 into open position (FIG. 1).

To provide an override for increased thermal excursion of expansible material 44 of power element 36 beyond the travel required to move valve member 34 into closed position (FIG. 2) whereby power element 36 is movable upwardly from a normal operating position established by end wall 70 of housing 40 such as illustrated in FIG. 2, an override spring 72 is illustrated as being received within chamber 38 of housing 40 to cooperate with return spring 60 in allowing such upward motion of the power element 36. Override spring 72 is shown with coils surrounding casing 42 and having its opposite ends seated against an end wall 74 of a housing cap 76 and against a radial shoulder 78 of casing 42. Such construction provided within housing 40 ensures that a conventional guide post is not required to be machined or otherwise formed to extend axially within chamber 38 to support and guide the casing 42 for movement within the housing 40. Accordingly, the cost of material and labor in the manufacture of the housing component is not only minimized, but a control assembly of a more compact size results in addition to reducing any frictional losses across the power element 36 which have been conventionally encountered with guide posts formed within the chamber such as at 38 of the housing component.

In addition, the disclosed structure also provides a pressure relief function when valve member 34 is in closed position. I.e., any force developed by fluid pressure at port 20 on valve member 34 which force is sufficient to force valve member 34 off its seat 58 causes the valve member 34, piston 52 and power element 36 to move in unison against the force of override spring 72 a sufficient distance necessary to balance the fluid pressure force on valve member 34 and to provide pressure relief. Upon reduction of the pressure with the fluid temperature remaining sufficiently high to maintain the power element 36 in an actuated condition, the valve member 34 will return into closed position under the bias of override spring 72. Upon fluid cooling, valve member 34 is retracted into its normal open or cold position (FIG. 1) by a return force applied by spring 60 via bracket 64 and the stamped metal retainer 66 exerting a return force on piston 52 to draw it into its normal open position as shown in FIG. 1.

In the specifically illustrated embodiment, housing 40 is jointly formed by cap 76 and a depending override cup retainer 80 which has an upper flared annular wall 82 secured to a base of cap 76 by a retaining ring 84. The cup retainer 80 has windows 86 ensuring that the fluid within chamber 38 flows freely into the confines of housing 40 and into direct contact with the heat conductive metal wall of casing 42 of power element 36. The sidewall of cap 76 is illustrated as being externally threaded for connection to a threaded opening 88 in block 12 although other suitable constructions are contemplated to ensure a pressure tight condition between the assembly 10 and block 12.

To provide for ease and accuracy of calibration, abutting ends of the power element casing 42 and piston guide 50 are shown as having confronting radial flanges between which diaphragm 46 is securely clamped, and an outer rim 90 (spacing means) of maximum thickness is preferably formed on flange 92 of piston guide 50 for direct metal-to-metal contact engagement with flange 78 of power element casing 42 (FIG. 3). By virtue of such metal-to-metal engagement, no trouble-some rubber-to-rubber calibration problem need be contended with as in conventional control assemblies to ensure an accurate valve starting position. Moreover, because of the described construction, any need to match the volume of the thermally expansible material 44 within power element 36 to valve travel at selected temperatures is significantly minimized.

Valve adjustment is made so that valve member 34 will start to move downwardly from its illustrated open position at a selected temperature under force exerted by piston 52. At temperatures below a particular value, the thermally expansible material 44 within power element 36 does not apply sufficient thrust to the piston 52 to move valve member 34; at temperatures above that value, valve member 34 moves downwardly by a corresponding amount. Initial adjustment is made to the power element 36 to establish a predetermined piston extension at a selected temperature. The casing 42 is immersed for a selected period of time in a setting tank, not shown, maintained at the selected temperature. If readjustment of the piston extension is required, the casing 42 of the power element 36 may be dented such as at 96 to roughly adjust its volume. Then further fine adjustment may be effected after assembly of the parts of control assembly 10 by adjusting the position of valve member 34 on the threaded stem 56 of piston 52 to provide proper valve closure against seat 58 within a preselected temperature range, say, from 228° F. to 232° F. Once such calibration is accomplished with valve member 34 threaded into position on stem 56, they may be secured in fixed relation by any well known conventional technique. As will be apparent to those skilled in the art, various modifications may be made to the teachings of this invention to adapt the assembly 10 for different applications and for normally closed as well as the described normally open condition of valve member 34.

The above described control assembly is of a compact size and provides the necessary actuation of the valve member to overcome both the fluid pressure and the spring forces. In addition to being temperature responsive, the described assembly provides for pressure relief as well as thermal excursion beyond that necessary to effect valve member closure.

As will be apparent to persons skilled in the art, various modifications, adaptations and variations of the foregoing specific disclosure can be made without departing from the teaching of this invention.

I claim:

1. A temperature and pressure responsive fluid flow control assembly comprising a temperature responsive valve actuator having a heat conductive casing containing a thermally expansible material, a housing having a chamber therein, the housing including a cup of stamped metal construction having an apertured end wall defining a first end wall of the housing and a side wall having openings therein defining side wall openings for the housing, said first apertured end wall of the housing serving as a seat for the valve actuator casing in a normal operating position, the valve actuator casing being received within the housing chamber for movement away from its normal operating position toward a second end wall of the housing opposite its said first end wall, an override spring urging the casing toward said normal operating position, the spring having opposite ends seated against said second end wall of the housing and against a radial shoulder formed on the casing of the valve actuator, a tubular guide secured to the casing to extend from the chamber through said first apertured end wall of the housing, a piston slidably mounted within the guide and having an end projecting from the guide, said projecting end of the piston carrying a valve member for movement between closed and open positions, the valve actuator casing having an end extending beyond its said radial shoulder and surrounded solely by the coils of the override spring with the end of the valve actuator casing in spaced relation to a confronting side wall of the housing and its said second end wall in said normal operating position of the valve actuator to permit substantially frictionless movement of the casing away from its said normal operating position against the force of the override spring to balance fluid pressure force on the valve member for effecting pressure relief.

2. The assembly of claim 1 wherein the valve actuator casing and the guide are movable in unison relative to the piston against the force of said override spring when the valve member is in closed position to accommodate additional thermal excursion of the thermally expansible material.

3. The assembly of claim 1 further including a retainer of stamped metal construction fixed to the piston adjacent its projecting end, a bracket fixed to the retainer and supported for movement on the guide, and a piston return spring having its opposite ends seated against the bracket and the guide.

4. The assembly of claim 1 wherein a diaphragm extends across abutting ends of the casing and guide, the abutting ends of the casing and guide including spacing means for ensuring direct abutting metal-to-metal engagement therebetween and for establishing a gap wherein a peripheral edge of the diaphragm is clamped therebetween.

* * * * *